(Specimen.)
S. D. CASTLE.
CEMENT PIPE AND EARTHENWARE.
No. 343,944. Patented June 15, 1886.
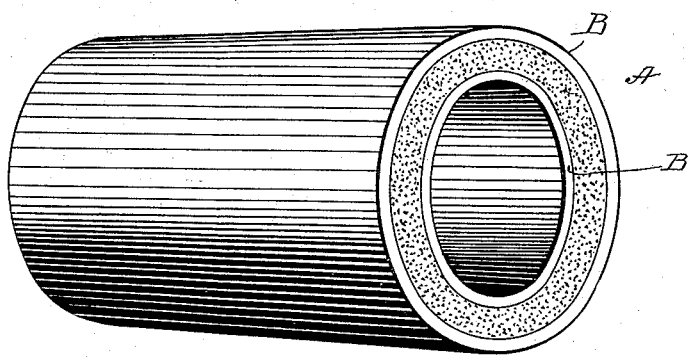
Witnesses
S. S. Williamson
Julian H. Sterling
Inventor
Samuel D. Castle
By
Smith & Hubbard
Attys

UNITED STATES PATENT OFFICE.

SAMUEL D. CASTLE, OF BRIDGEPORT, CONNECTICUT, ASSIGNOR OF ONE-HALF TO CHARLES E. WILLIAMS AND ELMER W. DEWHIRST, BOTH OF SAME PLACE.

CEMENT PIPE AND EARTHENWARE.

SPECIFICATION forming part of Letters Patent No. 343,944, dated June 15, 1886.

Application filed May 12, 1886. Serial No. 201,896. (Specimens.)

*To all whom it may concern:*

Be it known that I, SAMUEL D. CASTLE, a citizen of the United States, residing at Bridgeport, in the county of Fairfield and State of Connecticut, have invented certain new and useful Improvements in Cement Pipes and Earthenware; and I do hereby declare the following to be a full, clear, and exact description of the invention, such as will enable others skilled in the art to which it appertains to make and use the same.

My invention relates to certain novel and useful improvements in the construction of cement pipes and earthenware generally, and has for its object to render such pipes or ware impervious to air, moisture, gases, or acids, and, furthermore, to produce a more durable article; and with these ends in view my invention consists in certain details of construction and combination of elements, hereinafter fully set forth, and then specifically designated by the claims.

In order that those skilled in the art to which my invention appertains may more fully understand the same, I will proceed to describe it in detail, referring by letter to the accompanying drawing, forming a part of this specification, in which is illustrated an ordinary cement pipe constructed in accordance with my improvement.

It is a well-known fact that the ordinary cement pipe will become disintegrated in a few years unless it is thoroughly glazed, and even then it is gradually decomposed. Also, grease and all sorts of filth readily adhere to cement pipes and frequently choke them completely. Earthenware also, although finished and glazed with great care, will eventually become eaten by acids. Moreover, cement and earthen articles are very fragile, and any breakage thereof frequently gives rise to a great deal of annoyance.

My invention contemplates a remedy for these defects, and is applied as follows: The cement pipe or earthenware A is simply dipped in a strong solution of sulphur until a thick superficial jacket, B, is formed.

The solution is preferably modified with a small quantity of plaster-of-paris, in order to afford an extremely hard substance when dried.

The solution, when applied as above set forth, forms a coating completely impervious to air, moisture, gas, or acids, and to which grease and filth will not adhere. When dried, the coating presents a smooth and glassy appearance.

Any aniline or other coloring-matter may be mixed with the solution, if it is desirable that the coating should be of any specified color.

One of the especial advantages which my invention possesses is, that the coated article is not readily broken, since the external jacket is exceedingly hard and tough.

I do not wish to be understood as claiming any mixture of cement or earth and sulphur; but What I do claim as new, and desire to secure by Letters Patent, is—

1. As a new article of manufacture, cement or earthenware having a superficial coating of a sulphur compound, substantially as set forth.

2. As a new article of manufacture, a ware having an internal body of cement or earth and an external jacket of sulphur compound.

3. The method herein described of treating articles made from earth or cement, the same consisting in coating them superficially with a solution of sulphur, substantially as set forth.

In testimony whereof I affix my signature in presence of two witnesses.

SAMUEL D. CASTLE.

Witnesses:
S. S. WILLIAMSON,
JULIAN H. STERLING.